US009876783B2

(12) United States Patent
Koved et al.

(10) Patent No.: US 9,876,783 B2
(45) Date of Patent: *Jan. 23, 2018

(54) DISTRIBUTED PASSWORD VERIFICATION

(71) Applicant: International Business Machines Corporation, Armonk, NY (US)

(72) Inventors: Lawrence Koved, Pleasantville, NY (US); Gelareh Taban, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/977,690

(22) Filed: Dec. 22, 2015

(65) Prior Publication Data

US 2017/0180347 A1 Jun. 22, 2017

(51) Int. Cl.
*H04L 29/06* (2006.01)
*H04L 9/32* (2006.01)
*H04L 9/08* (2006.01)
*H04L 9/06* (2006.01)

(52) U.S. Cl.
CPC ............ *H04L 63/083* (2013.01); *H04L 9/06* (2013.01); *H04L 9/0811* (2013.01); *H04L 9/0838* (2013.01); *H04L 9/0841* (2013.01); *H04L 9/0844* (2013.01); *H04L 9/0847* (2013.01); *H04L 9/32* (2013.01); *H04L 9/3226* (2013.01); *H04L 9/3236* (2013.01); *H04L 63/06* (2013.01); *H04L 63/0876* (2013.01); *H04L 63/123* (2013.01)

(58) Field of Classification Search
CPC ... H04L 9/0811; H04L 9/0838; H04L 9/0841; H04L 9/0844; H04L 9/0847; H04L 9/083; H04L 9/06; H04L 9/102; H04L 9/3226; H04L 9/3236

USPC .......................................................... 713/171
See application file for complete search history.

(56) References Cited

U.S. PATENT DOCUMENTS

| 6,064,736 | A | 5/2000 | Davis et al. |
| 6,826,686 | B1 | 11/2004 | Peyravian et al. |
| 6,834,112 | B1 | 12/2004 | Brickell |
| 6,898,711 | B1 | 5/2005 | Bauman et al. |
| 6,996,718 | B1 * | 2/2006 | Henry .................... G06F 21/41 713/182 |
| 7,251,827 | B1 | 7/2007 | Guo et al. |
| 7,346,773 | B2 | 3/2008 | Cam-Winget et al. |
| 7,373,502 | B2 | 5/2008 | McGrew |
| 7,493,331 | B2 | 2/2009 | McGrew |
| 8,094,812 | B1 | 1/2012 | Tsang et al. |

(Continued)

FOREIGN PATENT DOCUMENTS

WO 2010076088 A2 7/2010

OTHER PUBLICATIONS

Juels et al., "Honeywords: Making Password-Cracking Detectable", CCS'13, Nov. 4-8, 2013, Berlin, Germany, pp. 145-159, Copyright is held by the owner/author(s), ACM 978-1-4503-2477—Sep. 13, 2011, <http://dx.doi.org/10.1145/2508859.2516671>.

(Continued)

*Primary Examiner* — Harunur Rashid
*Assistant Examiner* — Shahriar Zarrineh
(74) *Attorney, Agent, or Firm* — Lance I. Hochhauser

(57) ABSTRACT

Distribution of verification of passwords for electronic account. Password verification is distributed (divided) across multiple entities to reduce potential exposure in the event of a server exposure.

9 Claims, 3 Drawing Sheets

(56) References Cited

U.S. PATENT DOCUMENTS

| | | | |
|---|---|---|---|
| 8,166,301 B2 | 4/2012 | Cam-Winget et al. | |
| 8,214,642 B2 | 7/2012 | Baentsch et al. | |
| 8,225,384 B2* | 7/2012 | Pizano | H04L 63/0861 380/262 |
| 8,321,922 B1* | 11/2012 | Lo | G06F 21/43 455/411 |
| 8,370,901 B2* | 2/2013 | Huang | H04L 67/14 709/218 |
| 8,438,632 B2 | 5/2013 | Kanou et al. | |
| 8,745,401 B1* | 6/2014 | Hintz | H04L 9/3226 713/158 |
| 8,745,715 B2* | 6/2014 | Lindholm | H04L 63/083 713/169 |
| 8,775,810 B1 | 7/2014 | Snodgrass et al. | |
| 8,819,825 B2 | 8/2014 | Keromytis et al. | |
| 9,154,482 B2* | 10/2015 | Dudziak | H04L 63/08 |
| 9,154,496 B2* | 10/2015 | Juels | H04L 63/083 |
| 9,230,092 B1 | 1/2016 | Juels | |
| 9,258,118 B1* | 2/2016 | Roth | H04L 9/0863 |
| 9,294,460 B1 | 3/2016 | Thomas | |
| 9,325,499 B1* | 4/2016 | Juels | H04L 9/30 |
| 9,330,245 B2 | 5/2016 | Maron | |
| 9,379,896 B1* | 6/2016 | Altman | G06F 21/46 |
| 9,509,682 B2* | 11/2016 | Jo | G06F 21/33 |
| 2002/0184217 A1 | 12/2002 | Bisbee et al. | |
| 2002/0194478 A1 | 12/2002 | MacKenzie | |
| 2003/0172281 A1* | 9/2003 | Lee | G06F 21/46 713/183 |
| 2003/0187821 A1* | 10/2003 | Cotton | G06Q 10/10 |
| 2003/0196087 A1* | 10/2003 | Stringer | G06F 21/6209 713/171 |
| 2004/0019786 A1* | 1/2004 | Zorn | H04L 9/3273 713/168 |
| 2004/0158714 A1 | 8/2004 | Peyravian et al. | |
| 2005/0022020 A1 | 1/2005 | Fremberg | |
| 2005/0050328 A1 | 3/2005 | Mizrah | |
| 2005/0108579 A1* | 5/2005 | Isaacson | G06F 21/31 726/19 |
| 2005/0154889 A1* | 7/2005 | Ashley | H04L 63/0435 713/171 |
| 2006/0021036 A1* | 1/2006 | Chang | G06F 21/31 726/22 |
| 2006/0161786 A1 | 7/2006 | Rao | |
| 2007/0061571 A1* | 3/2007 | Hammes | G06F 21/31 713/168 |
| 2007/0061572 A1 | 3/2007 | Imai et al. | |
| 2007/0073817 A1* | 3/2007 | Gorty | G06F 21/33 709/206 |
| 2007/0220598 A1 | 9/2007 | Salowey et al. | |
| 2008/0016333 A1 | 1/2008 | Cao et al. | |
| 2008/0134346 A1 | 6/2008 | Cho et al. | |
| 2008/0181403 A1 | 7/2008 | Sakamoto | |
| 2009/0158404 A1* | 6/2009 | Hahn | H04L 63/083 726/5 |
| 2009/0288143 A1 | 11/2009 | Stebila et al. | |
| 2009/0320117 A1* | 12/2009 | Liu | H04L 63/0807 726/9 |
| 2009/0327740 A1* | 12/2009 | Schneider | G06F 21/46 713/183 |
| 2010/0125906 A1* | 5/2010 | Golle | G06F 21/31 726/18 |
| 2010/0131755 A1 | 5/2010 | Zhu et al. | |
| 2010/0131756 A1* | 5/2010 | Schneider | G06F 21/31 713/155 |
| 2010/0162390 A1 | 6/2010 | Wildensteiner | |
| 2011/0029490 A1 | 2/2011 | Agarwal et al. | |
| 2011/0078779 A1 | 3/2011 | Liu et al. | |
| 2011/0131415 A1* | 6/2011 | Schneider | H04L 9/3226 713/171 |
| 2012/0087493 A1* | 4/2012 | Chidambaram | H04L 9/0841 380/44 |
| 2012/0131331 A1 | 5/2012 | Benson | |
| 2012/0151566 A1 | 6/2012 | Lin et al. | |
| 2012/0210408 A1* | 8/2012 | Lu | H04L 63/0846 726/6 |
| 2013/0125221 A1* | 5/2013 | Agrawal | H04L 9/3226 726/6 |
| 2013/0145457 A1* | 6/2013 | Papakipos | G06F 21/6245 726/19 |
| 2013/0159711 A1* | 6/2013 | Kaal | H04W 12/02 713/168 |
| 2013/0247152 A1 | 9/2013 | Minami et al. | |
| 2014/0101742 A1 | 4/2014 | Wu et al. | |
| 2014/0143548 A1 | 5/2014 | Wang | |
| 2014/0189808 A1* | 7/2014 | Mahaffey | H04L 63/0853 726/4 |
| 2014/0189829 A1 | 7/2014 | McLachlan et al. | |
| 2014/0201536 A1 | 7/2014 | Fiske | |
| 2015/0046998 A1 | 2/2015 | Harwood et al. | |
| 2015/0147970 A1* | 5/2015 | Tan | H04W 12/08 455/41.2 |
| 2015/0205755 A1* | 7/2015 | Gilbert | H04L 9/083 726/9 |
| 2015/0312040 A1 | 10/2015 | Zheng | |
| 2015/0319149 A1 | 11/2015 | Alshammari | |
| 2015/0332059 A1 | 11/2015 | Johnson et al. | |
| 2015/0349960 A1 | 12/2015 | Bagley | |
| 2015/0350186 A1* | 12/2015 | Chan | H04L 63/083 726/9 |
| 2015/0365232 A1 | 12/2015 | Yang et al. | |
| 2016/0005029 A1 | 1/2016 | Ivey et al. | |
| 2016/0021094 A1 | 1/2016 | Dong et al. | |
| 2016/0253488 A1 | 9/2016 | Zheng | |
| 2016/0286391 A1 | 9/2016 | Khan | |

OTHER PUBLICATIONS

Juels, et al., "Honeywords: Making Password-Cracking Detectable", CCS'13, Nov. 4-8, 2013, Berlin, Germany, pp. 145-159.

Kontaxis, et al., "SAuth: Protecting User Accounts from Password Database Leaks", CCS'13, Nov. 4-8, 2013, Berlin, Germany, 12 pages.

Shirvanian, et al., "Two-Factor Authentication Resilient to Server Compromise Using Mix-Bandwidth Devices", NDSS '14, Feb. 23-26, 2014, San Diego, CA, USA, Copyright 2014 Internet Society, 16 pages.

Taban, et al., "Cache and Carry: Distribution of Credential Cache to Thwart Server Attacks", printed Sep. 30, 2015, 15 pages.

U.S. Appl. No. 15/091,930 Entitled "Distributed Password Verification", filed Apr. 6, 2016.

Appendix P.: List of IBM Patents or Patent Applications Treated as Related, 2 pages.

Koved et al., "Distributed Password Verification", U.S. Appl. No. 15/344,729, filed Nov. 7, 2016, 31 pages.

IBM, Appendix P, List of IBM Patents or Patent Applications Treated As Related, dated Nov. 7, 2016, 2 pages.

* cited by examiner

DISTRIBUTED PASSWORD VERIFICATION

BACKGROUND

The present invention relates generally to the field of data processing, and more particularly to data security and determination of access rights.

Businesses store client account information on a centralized server, specifically client identifiers (usernames and/or passwords). In the event an individual achieves unauthorized access to a location in which client identifiers are stored, all client accounts are compromised. There have been many examples of this in recent times, from banks to multinational businesses to social networks. In some of these events, the businesses had even taken the security step of performing hash functions on stored data. The exposure for these companies arose out of the centralized nature of client identification storage. That is, gaining unauthorized access to one location (the server) allowed unauthorized access to all client accounts.

SUMMARY

According to an aspect of the present invention, there is a method, computer program product, and/or system that performs the following operations (not necessarily in the following order): (i) creating a token on a first server based, at least in part, on a first set of client identifiers for a client; (ii) transmitting the token from the first server to the client; (iii) deleting the token and the first set of client identifiers from the first server; (iv) receiving, on the first server, the token and a second set of client identifiers for the client; and (v) comparing a first client identifier in the second set of client identifiers to the token to verify an identity of the client. At least comparing the first client identifier in the second set of client identifiers to the token is performed by computer software running on computer hardware.

DETAILED DESCRIPTION

Figure 1:
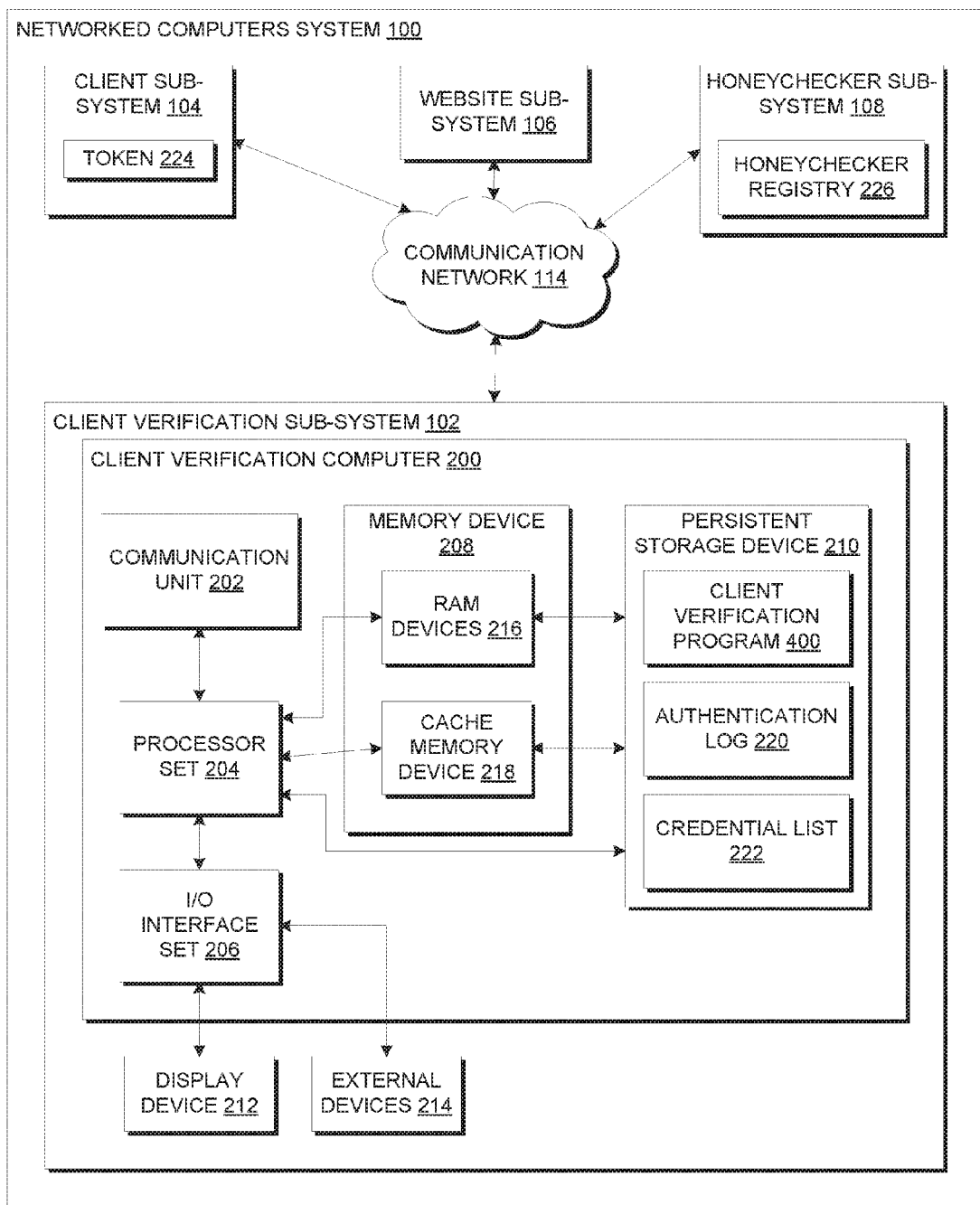
FIG. 1 is a block diagram view of a first embodiment of a system according to the present invention.

Distribution of verification of passwords for electronic account. Password verification is distributed (divided) across multiple entities to reduce potential exposure in the event of a server exposure. This Detailed Description section is divided into the following sub-sections: (i) Hardware and Software Environment; (ii) Example Embodiment; (iii) Further Comments and/or Embodiments; and (iv) Definitions.

I. Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: client verification sub-system 102; client sub-system 104; website sub-system 106; and honeychecker sub-system 108; and communication network 114. Client verification sub-system 102 contains: client verification computer 200; display device 212; and external devices 214. Client verification computer 200 contains: communication unit 202; processor set 204; input/output (I/O) interface set 206; memory device 208; and persistent storage device 210. Memory device 208 contains: random access memory (RAM) devices 216; and cache memory device 218. Persistent storage device 210 contains: authentication log 220; credential list 222; and client verification program 400. Client sub-system 104 contains: token 224. Honeychecker sub-system 108 contains: honeychecker registry 226.

Client verification sub-system 102 is, in many respects, representative of the various computer sub-systems in the present invention. Accordingly, several portions of client verification sub-system 102 will now be discussed in the following paragraphs.

Client verification sub-system 102 may be a laptop computer, a tablet computer, a netbook computer, a personal computer (PC), a desktop computer, a personal digital assistant (PDA), a smart phone, or any programmable electronic device capable of communicating with client sub-systems via communication network 114. Client verification program 400 is a collection of machine readable instructions and/or data that is used to create, manage, and control certain software functions that will be discussed in detail, below, in the Example Embodiment sub-section of this Detailed Description section.

Client verification sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between client verification sub-system 102 and client sub-systems.

Client verification sub-system 102 is shown as a block diagram with many double arrows. These double arrows (no separate reference numerals) represent a communications fabric, which provides communications between various components of client verification sub-system 102. This communications fabric can be implemented with any architecture designed for passing data and/or control information between processors (such as microprocessors, communications processors, and/or network processors, etc.), system memory, peripheral devices, and any other hardware components within a system. For example, the communications fabric can be implemented, at least in part, with one or more buses.

Memory device 208 and persistent storage device 210 are computer readable storage media. In general, memory device 208 can include any suitable volatile or non-volatile computer readable storage media. It is further noted that, now and/or in the near future: (i) external devices 214 may be able to supply some, or all, memory for client verification sub-system 102; and/or (ii) devices external to client verification sub-system 102 may be able to provide memory for client verification sub-system 102.

Client verification program 400 is stored in persistent storage device 210 for access and/or execution by one or more processors of processor set 204, usually through memory device 208. Persistent storage device 210: (i) is at least more persistent than a signal in transit; (ii) stores the program (including its soft logic and/or data) on a tangible medium (such as magnetic or optical domains); and (iii) is substantially less persistent than permanent storage. Alternatively, data storage may be more persistent and/or permanent than the type of storage provided by persistent storage device 210.

Client verification program 400 may include both substantive data (that is, the type of data stored in a database) and/or machine readable and performable instructions. In this particular embodiment (i.e., FIG. 1), persistent storage device 210 includes a magnetic hard disk drive. To name some possible variations, persistent storage device 210 may include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer readable storage medium that is also part of persistent storage device 210.

Communication unit 202, in these examples, provides for communications with other data processing systems or devices external to client verification sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communications unit (such as communication unit 202).

I/O interface set 206 allows for input and output of data with other devices that may be connected locally in data communication with client verification computer 200. For example, I/O interface set 206 provides a connection to external devices 214. External devices 214 will typically include devices, such as a keyboard, a keypad, a touch screen, and/or some other suitable input device. External devices 214 can also include portable computer readable storage media, such as, for example, thumb drives, portable optical or magnetic disks, and memory cards. Software and data used to practice embodiments of the present invention (e.g., client verification program 400) can be stored on such portable computer readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
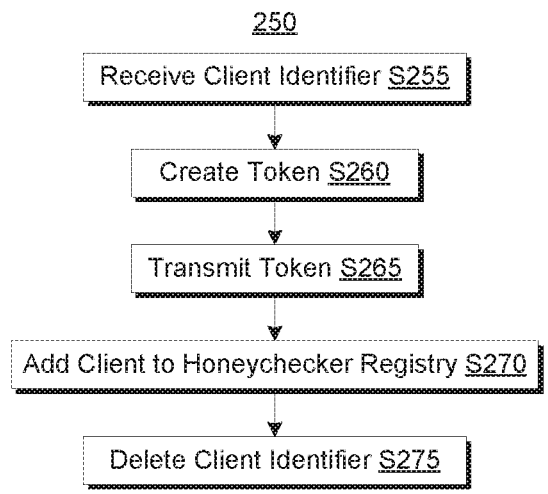
FIG. 2 is a flowchart showing a first embodiment method performed, at least in part, by the first embodiment system.
Figure 3:
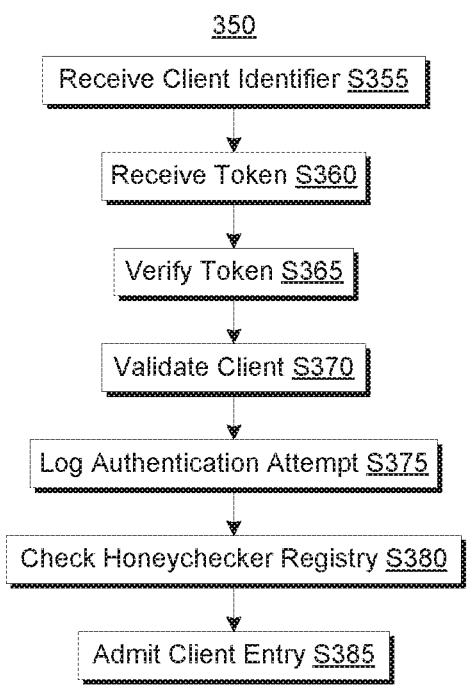
FIG. 3 is a flowchart showing a second embodiment method performed, at least in part, by the first embodiment system.
Figure 4:
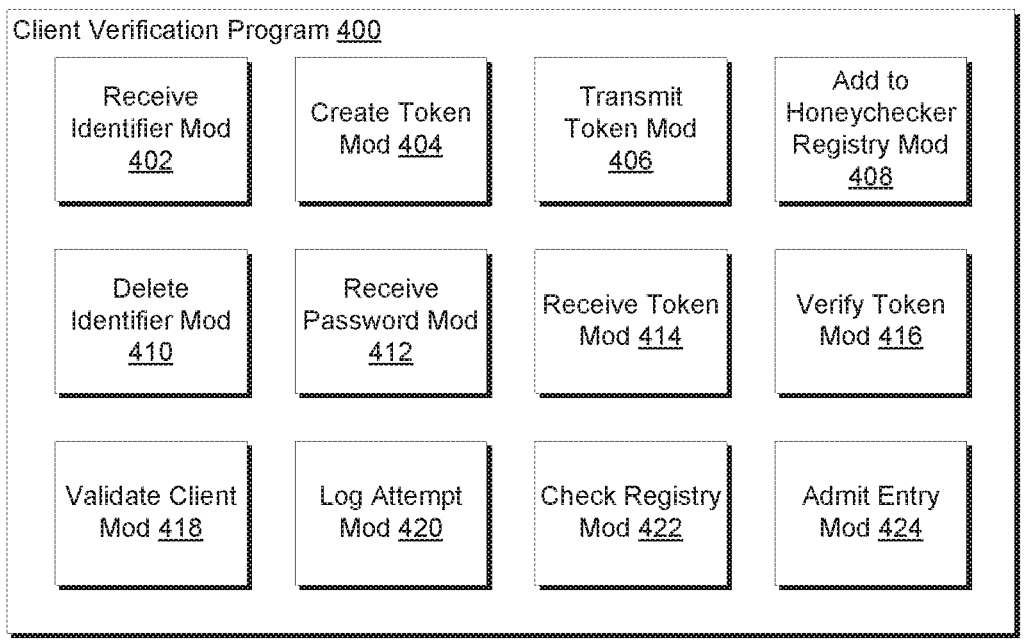
FIG. 4 is a block diagram view of a machine logic (e.g., software) portion of the first embodiment system.

FIG. 2 shows flowchart 250 depicting a first method according to the present invention. FIG. 3 shows flowchart 350 depicting a second method according to the present invention. FIG. 4 shows client verification program 400, which performs at least some of the method operations of flowchart 250 and/or flowchart 350. These methods and associated software will now be discussed, over the course of the following paragraphs, with extensive reference to FIG. 2 and FIG. 3 (for the method operation blocks) and FIG. 4 (for the software blocks). In this example Amy is creating an online account at a banking website (FIG. 2), then Amy is logging into the banking website using the newly created online account (FIG. 3).

With respect to flowchart 250, processing begins at operation S255, where receive identifier module ("mod") 402 receives a client identifier. In some embodiments of the present invention, receive identifier mod 402 receives a client identifier from a client as an initial account set-up. In some embodiments of the present invention, a client identifier includes a username and a password. A username is sometimes also called a user name, a user identifier, and/or an email address. A username is used to identify a user. A password is used to determine credentials of a user. In some embodiments of the present invention, receive identifier mod 402 receives only a password as a client identifier. In this example, receive identifier mod 402 receives a username and a password from Amy. Amy's username is "Amy1234," and her password is "password."

Processing proceeds to operation S260, where create token mod 404 creates a token based, at least in part, on a client identifier. In some embodiments of the present invention, create token mod 404 creates token 224 corresponding to the client identifier received in operation S255 and stores token 224 to client verification sub-system 102. A token is an electronic file that is used to validate or verify a client. A token is sometimes also called a ticket. In some embodiments of the present invention, create token mod 404 employs security measures to protect a client identifier. In some embodiments, create token mod 404 creates token 224. In this example, create token mod 404 includes within token 224 Amy's username and a hashed version of Amy's password. In some embodiments of the present invention, create token mod 404 includes a plaintext version (sometimes also called a decrypted version) of a password within a token. In further embodiments, create token mod 404 includes within a token an identifier of client verification sub-system 102. In some of these embodiments, create token mod 404 includes in a token an identifier of client verification sub-system 102 as a security measure. In this example, create token mod 404 includes a hash function of the name of client verification sub-system 102 as the identifier of client verification sub-system 102.

Processing proceeds to operation S265, where transmit token mod 406 transmits a token to a user. In some embodiments of the present invention, transmit token mod 406 transmits the token created in operation S260 to client sub-system 104 (sometimes also called a client and/or a user). In this example, transmit token mod 406 transmits token 224 to client sub-system 104.

Processing proceeds to operation S270, where add to honeychecker mod 408 adds a username to a honeychecker registry. In some embodiments of the present invention, add to honeychecker mod 408 adds the username received in operation S255 to honeychecker registry 226 on honeychecker sub-system 108 (sometimes also called a second server) to create an ability to verify client identifiers in a distributed manner. In this example, add to honeychecker mod 408 adds Amy's username and a hash function of Amy's password to honeychecker registry 226. In some embodiments of the present invention, processing proceeds from operation S265 to operation S275, omitting operation S270. In some embodiments, add to honeychecker mod 408 adds a username and password to a credential list. For example, add to honeychecker mod 408 adds "Amy1234" and "password" to credential list 222. In further embodiments, add to honeychecker mod 408 adds honeywords to credential list 222 corresponding to a username. For example, add to honeychecker mod 408 adds "not password" and "honeyword" as honeywords to credential list 222. A honeyword is a word, phrase, and/or term that acts as a false credential. In some embodiments, a honeyword is added to a credential list as a security measure. In some embodiments of the present invention, add to honeychecker mod 408 adds honeywords to a credential list to deter malicious attacks. Alternatively, add to honeychecker mod 408 adds a set of honeywords to a credential list to confuse malicious attackers. In some embodiments, add to honeychecker mod 408 adds a set of honeywords to a token.

Processing terminates at operation S275, where delete identifier mod 410 deletes a client identifier. In some embodiments of the present invention, delete identifier mod 410 deletes from client verification sub-system 102 the client identifier received in operation S255 as a security measure. In some embodiments of the present invention, delete identifier mod 410 deletes a client identifier as a security measure. In some further embodiments, delete identifier mod 410 also deletes a token. In this example, delete identifier mod 410 deletes all information related to the token, Amy's password, Amy's username, and the honeywords corresponding to Amy's username.

With respect to flowchart 350, processing begins at operation S355, where receive client identifier mod 412 receives a client identifier. In some embodiments of the present invention, receive client identifier mod 412 receives a second client identifier (as a log-in and/or as an authentication) that may be distinct from the client identifier received in operation S255. In this example, receive client identifier mod 412 receives a username ("Amy1234") and a password ("password") from Amy as a client identifier. In some embodiments of the present invention, receive client identifier mod 412 receives an incorrect client identifier and/or an incorrect password. In some alternative embodiments, receive client identifier mod 412 receives only a password as a client identifier. In some embodiments, receive client identifier mod 412 receives a honeyword as a client identifier.

Processing proceeds to operation S360, where receive token mod 414 receives a token. In some embodiments of the present invention, receive token mod 414 receives a second token that may be distinct from the token created in operation S260. In this example, receive token mod 414 receives token 224 from Amy. In some embodiments of the present invention, receive token mod 414 receives a fraudulent token. In some embodiments, operation S360 is combined with operation S355, and a token is received with a client identifier.

Processing proceeds to operation S365, where verify token mod 416 verifies a token. In some embodiments of the present invention, verify token mod 416 verifies the token received in operation S360 is the token created in operation S260. Verify token mod 416 verifies that a token received in operation S360 is a token created by client verification sub-system 102. In some embodiments of the present invention, verify token mod 416 verifies an identifier in a token. In this example, verify token mod 416 verifies that token 224 is the same token 224 transmitted to Amy in operation S265 by comparing a hash function of the name of client verification sub-system 102 against token 224 to ensure that the identifier of client verification sub-system 102 appears in token 224.

Processing proceeds to operation S370, where validate client mod 418 validates a client. In some embodiments of the present invention, validate client mod 418 validates the client identifier received in operation S355 using the token verified in operation S365. In some embodiments of the present invention, validate client mod 418 validates a client through a comparison of a client identifier (received in operation S355) against a token (received in operation S360). In this example, validate client mod 418 compares a hash function of the password received from Amy in operation S355 ("password") against token 224 to ensure that the password received from Amy in operation S355 is the password for the account created in operation S255. In some alternative embodiments, validate client mod 418 validates a client through a comparison of a client identifier and a token against a credential list. In some of these embodiments, validate client mod 418 validates a client even though a client identifier matches a honeyword. For example, validate client mod 418 receives Amy's username "Amy1234" and a password "honeyword" as a client identifier.

Processing proceeds to operation S375, where log attempt mod 420 logs an authentication attempt. In some embodiments of the present invention, log attempt mod 420 logs the receipt of the client identifier in operation S355 to authentication log 220. In some embodiments of the present invention, log attempt mod 420 logs an authentication attempt to maintain a record of attempts to access various client accounts. In some of these embodiments, log attempt mod 420 logs a client identifier in an authentication log. In some further embodiments, log attempt mod 420 logs a username in an authentication log. In this example, log attempt mod 420 logs Amy's username ("Amy1234") to authentication log 220.

Processing proceeds to operation S380, where check registry mod 422 checks a client identifier against a honeychecker registry. In some embodiments of the present invention, check registry mod 422 checks the client identifier validated in operation S370 against honeychecker registry 226 on honeychecker sub-system 108. If check registry mod 422 determines that a client identifier appears on a honeychecker registry and is not a honeyword, check registry mod 422 allows processing to proceed to operation S385. Alternatively, if check registry mod 422 determines that a client identifier does not appear on a honeychecker registry, check registry mod 422 terminates processing and does not allow a client to enter website sub-system 108. In some embodiments of the present invention, check registry mod 422 determines that a client identifier does not appear on a honeychecker registry and that the client identifier is a honeyword. For example, check registry mod 422 checks Amy's username "Amy1234" and a password "honeyword" against honeychecker registry 226 and determines that "honeyword" does not appear in honeychecker registry 226.

Therefore, in this example, check registry mod 422 determines that "honeyword" is a honeyword. In some embodiments, check registry mod 422 locks an account if a honeyword is used. In some embodiments of the present invention, processing omits operation S380 and proceeds from operation S375 to operation S385. In this example, check registry mod 422 checks Amy's client identifier (username and password) against honeychecker registry 226 and determines that Amy's client identifier is not a honeyword.

Processing terminates at operation S385, where admit entry mod 424 admits entry to a client. In some embodiments of the present invention, admit entry mod 424 admits entry of the client to website sub-system 106. In some embodiments of the present invention, admit entry mod 424 admits entry of a client to a secure area. In some embodiments, admit entry mod 424 determines that verify token mod 416, validate client mod 418, and check registry mod 422 have all returned positive results (i.e., a token is verified, a client is validated, and a client identifier is not a honeyword). In this example, admit entry mod 424 admits entry to Amy.

III. Further Comments and/or Embodiments

Some embodiments of the present invention recognize the following facts, potential problems, and/or potential areas for improvement with respect to the current state of the art: (i) storing account information for a variety of users in a single location creates an incentive for malicious attacks; (ii) storing account information for a variety of users in a single location increases the potential harm to users for each successful malicious attack; and/or (iii) increases in computing power increase the ability to perpetrate malicious attacks. Some embodiments of the present invention recognize that improper recovery of account credentials allows for improper authentication. However, authentication of an account does not necessarily allow for proper recovery of account credentials.

In some embodiments of the present invention, a client verification sub-system determines if a server has been compromised. In some of these embodiments, a client verification sub-system protects against a compromise of a credential list. In some embodiments, a client verification sub-system employs a honeychecker sub-system to protect against a compromise of a credential list.

Some embodiments of the present invention recognize the following facts, potential problems, and/or potential areas for improvement with respect to the current state of the art: (i) theft of credentials results in additional problems because users reuse credentials across various secure locations; (ii) reliance on computational complexity of an attacker is an inaccurate representation of security concerns; (iii) salted one-way hash functions are insufficient to protect user credentials stored on a server; (iv) reuse of credentials across various services exposes these services to chains of attacks (e.g., an account on a bank server is compromised, an attack uses a set of credentials to log into a store website, the attacker then compromises accounts on the store website).

Some embodiments of the present invention employ a multilevel security architecture. In some of these embodiments, a user connects to an internal network using a transport layer security. In further embodiments, an internal network includes a variety of servers, with a subset of the variety of servers acting as an authentication server. In some additional embodiments an internal network communicates over a secure network to a honeychecker server. In some of these embodiments, a honeychecker server includes, but is not limited to, one or more of: (i) online or offline access; (ii) a simple application user interface (API); and/or (iii) optional responsiveness.

Some embodiments of the present invention may include one, or more, of the following features, characteristics, and/or advantages: (i) ensuring that a server compromise yields no wholesale theft of credential information through distributed authentication; and/or (ii) detecting server compromise in a system. In some embodiments of the present invention, a client verification sub-system performs registration and/or authentication.

Some embodiments of the present invention perform registration operations including, but not limited to: (i) identifying a client using a client identifier (e.g., a user, a pseudo-user, a device); (ii) receiving a client identifier (e.g., credential, data) or a delegation request (e.g., new client id, new credential, expired credential, alternative access); (iii) creating a token using a set of secure keys and a client identifier (e.g., credential, access, expiration time, data, key id); (iv) transmitting a token to a client; (v) deleting all credential information and/or a created token; (vi) adding a client to a registry (e.g., a client identifier, a token identifier, a set of revocations, a set of authentication attempts, an account status, a device status); (vii) sending a client identifier to a honeychecker server; and/or (viii) adding a client identifier to a honeychecker registry.

Some embodiments of the present invention perform authentication operations including, but not limited to: (i) receiving a client identifier (e.g., a credential, a token); (ii) verifying a token authenticity; (iii) decrypting a token; (iv) validating a user based, at least in part, on a security policy (e.g., credential, revocation, expiration); (v) transmitting an authentication decision (e.g., accept, deny); (vi) logging an authentication attempt in an authentication log; (vii) sending a client identifier to a honeychecker server; (viii) verifying a client identifier matches a registry; (ix) receiving an authentication response from a honeychecker server (e.g., accept, deny); (x) transmitting a log file to a honeychecker server; verifying a set of entries in a log file.

Some embodiments of the present invention may include one, or more, of the following features, characteristics, and/or advantages: (i) account credential information is not stored on a server; (ii) account credential information is stored locally with each user; and/or (iii) account credential distribution allows for flexible authentication techniques (e.g., simple passwords, biometric scans). Some embodiments of the present invention may include one, or more, of the following features, characteristics, and/or advantages: (i) transmitting a set of server verification data (e.g., a token, an authenticated encryption using server keys) to a user; (ii) receiving a password from a user; (iii) receiving a set of server verification data from a user; (iv) authenticating a user based, at least in part, on a password and a set of server verification data received from the user; and/or (v) deleting a password and a set of server verification data.

Some embodiments of the present invention may include one, or more, of the following features, characteristics, and/or advantages: (i) distributed authentication data decreases risks to users for each successful attack; (ii) honeychecker server allows for determination of fraudulent tokens and/or other successful attacks on a server. In some embodiments of the present invention, a token includes a set of security measures including, but not limited to: (i) device specific coding; (ii) individualized credentials; (iii) access control; and/or (iv) implementation of a set of tokens. In some further embodiments, a token is used to delegate access. Alternatively, a token is used to impersonate a user. In further alternative embodiments, a token is used to increase account privacy. In some embodiments, a token is stored: (i) on a user device; (ii) on a variety of devices belonging to a single user; (iii) on a browser; and/or (iv) on a cloud server. In some other embodiments, a variety of servers can authenticate a token using a shared server key.

Some embodiments of the present invention may include one, or more, of the following features, characteristics, and/or advantages: (i) eliminate storage of user credentials on a server; (ii) eliminate mass scale credential theft; (iii) eliminate additional communication among servers; and/or (iv) decrease likelihood of server attacks. In some embodiments of the present invention, a token is used to store additional sensitive user information (e.g., credit card data).

Some embodiments of the present invention may include one, or more, of the following features, characteristics, and/or advantages: (i) improve authentication mechanism for existing authentication schemes; (ii) improve authentication mechanisms for future authentication schemes; (iii) confine effects of a server attack and/or server compromise; (iv) improve security; and/or (v) improve usability.

Some embodiments of the present invention may include one, or more, of the following features, characteristics, and/or advantages: (i) decreasing impact of wholesale credential leakage of centrally stored credentials; (ii) decreasing likelihood of wholesale credential leakage; (iii) distinguishing attacks from verified users; (iv) determining that a token is valid, but bogus; (v) decreasing trust levels placed on centralized servers; (vi) increasing strength of weak passwords; (vi) implementing additional security policies on a token; (vii) decreasing password reuse attacks through the use of a token; and/or (viii) storing the salted hash of a client identifier.

Some embodiments of the present invention may include one, or more, of the following features, characteristics, and/or advantages: (i) adding decoy credentials (honeywords) to a credential list; (ii) not adding changes and/or upgrades to client-side devices and/or applications; (iii) not tying a user to a specific device; (iv) not tying a user to a specific platform; (v) allowing for cross-platform detection of password reuse; and/or (vi) allowing for cross-website detection of password reuse. Some embodiments of the present invention may include one, or more, of the following features, characteristics, and/or advantages: (i) resistant to dictionary attacks; (ii) resistant to brute force attacks; (iii) resistant to rainbow attacks; (iv) resistant to credential recovery attacks; (v) resistant to password cracking tools; (vi) resistant to password guessing software; (vii) resistant to malware (e.g., key logging); and/or (viii) resistant to Trojan horses.

Some embodiments of the present invention may include one, or more, of the following features, characteristics, and/or advantages: (i) storing device-specific data in a token; (ii) transmitting a token as a cookie; (iii) coding a token with an expiration time; (iv) using a random encryption key as an identifier of a client verification sub-system; (v) using a random encryption key with a unique index number as an identifier of a client verification sub-system; (vi) decrypting a token using a decryption key; (vii) allowing a client to maintain multiple tokens (e.g., a smartphone and a laptop have separate tokens); and/or (viii) allowing a client to transfer a token from a first device to a second device.

Some embodiments of the present invention may include one, or more, of the following features, characteristics, and/or advantages: (i) revoking an account credential; (ii) revoking a token; (iii) updating a registry to reflect revoked accounts; (iv) updating an account credential; (v) updating a token; (vi) implementing an expiration time for an account credential; (vii) implementing an expiration time for a token; and/or (viii) storing an encryption key on a user-side device and a token on a server-side device.

Some embodiments of the present invention may include one, or more, of the following features, characteristics, and/or advantages: (i) implementing a client verification sub-system on an application; (ii) implementing a client verification sub-system on a browser; (iii) creating tokens in temporary locations; (iv) recursively reading a file directory; (v) synchronizing a token across multiple devices; (vi) using network channels to transfer a token among various devices; (vii) using input/output devices to transfer a token among various devices; and/or (viii) allowing for guest account access using tokens.

Some embodiments of the present invention may include one, or more, of the following features, characteristics, and/or advantages: (i) implementing security policies to support multiple credentials for a user; (ii) restricting access to some functions based, at least in part, on a security policy of a token; (iii) restricting server information leaks if a server is compromised; (iv) promoting account privacy; (v) receiving account delegations to create a restricted access token; (vi) storing additional private data on a token (e.g., credit card information, health records); and/or (vii) using multiple tokens for various aspects of a website (e.g., a login token, a payment token).

Some embodiments of the present invention may include one, or more, of the following features, characteristics, and/or advantages: (i) recording a timestamp at the creation of a token; (ii) creating a token encryption that based, at least in part, on a timestamp at the creation of the token; (iii) storing a key index used to generate a token; (iv) determining whether a token was created with a stored key index; (v) storing a token tag; (vi) alerting an administrator to an attempted fraudulent access; (vii) allowing access to a controlled environment on use of fraudulent credential information; and/or (viii) isolating a honeychecker sub-system from outside systems and/or sub-systems.

Some embodiments of the present invention may include one, or more, of the following features, characteristics, and/or advantages: (i) implementing secure credential recovery sequences; (ii) storing token identifiers; (iii) logging failed authentication attempts; and/or (iv) logging token metadata (e.g., expiration time).

IV. Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/ or application-specific integrated circuit (ASIC) based devices.

"Electrically connected" means either indirectly electrically connected such that intervening elements are present or directly electrically connected. An "electrical connection" may include, but need not be limited to, elements such as capacitors, inductors, transformers, vacuum tubes, and the like.

"Mechanically connected" means either indirect mechanical connections made through intermediate components or direct mechanical connections. "Mechanically connected" includes rigid mechanical connections as well as mechanical connection that allows for relative motion between the mechanically connected components. "Mechanically connected" includes, but is not limited to: welded connections; solder connections; connections by fasteners (e.g., nails, bolts, screws, nuts, hook-and-loop fasteners, knots, rivets, quick-release connections, latches, and/or magnetic connections); force fit connections; friction fit connections; connections secured by engagement caused by gravitational forces; pivoting or rotatable connections; and/or slidable mechanical connections.

A "data communication" includes, but is not necessarily limited to, any sort of data communication scheme now known or to be developed in the future. "Data communications" include, but are not necessarily limited to: wireless communication; wired communication; and/or communication routes that have wireless and wired portions. A "data communication" is not necessarily limited to: (i) direct data communication; (ii) indirect data communication; and/or (iii) data communication where the format, packetization status, medium, encryption status, and/or protocol remains constant over the entire course of the data communication.

The phrase "without substantial human intervention" means a process that occurs automatically (often by operation of machine logic, such as software) with little or no human input. Some examples that involve "no substantial human intervention" include: (i) a computer is performing complex processing and a human switches the computer to an alternative power supply due to an outage of grid power so that processing continues uninterrupted; (ii) a computer is about to perform resource intensive processing and a human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

"Automatically" means "without any human intervention."

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

What is claimed is:

1. A method comprising:
   creating a first token on a first server based, at least in part, on a first set of client identifiers for a client and an encryption key, wherein:
      the first set of client identifiers includes:
         a first hashed password for the client, and
         a first username for the client, and
      the first token is encrypted;
   transmitting the first token from the first server to the client;
   adding, to a honeychecker registry on a second server, the first username, wherein the honeychecker registry is a list of valid usernames;
   deleting the first token and the first set of client identifiers from the first server;
   receiving, on the first server, a second token and a second set of client identifiers for the client, wherein:
      the second token is encrypted,
      the second token is equivalent to the first token, and
      the second set of client identifiers includes:
         a second hashed password, and
         a second username;

decrypting the second token using a decryption key to reveal the first set of client identifiers;
comparing the second hashed password to the first hashed password from the second token to verify an identity of the client;
determining that the second username does not appear in the honeychecker registry; and
denying, to the client, responsive to determining that the second username does not appear in the honeychecker registry, access to the account to prevent an unauthorized access;
wherein:
   at least comparing the second hashed password to the first hashed password from the second token is performed by computer software running on computer hardware.

2. The method of claim 1, further comprising:
logging the second username to an authentication log.

3. The method of claim 1, wherein creating the first token is further based, at least in part, on a device identifier for a device used by the client.

4. A computer program product comprising:
a computer readable storage medium having stored thereon:
   first instructions executable by a device to cause the device to create a first token on a first server based, at least in part, on a first set of client identifiers for a client and an encryption key, wherein:
      the first set of client identifiers includes:
         a first hashed password for the client, and
         a first username for the client, and
      the first token is encrypted;
   second instructions executable by a device to cause the device to transmit the first token from the first server to the client;
   third instructions executable by a device to cause the device to add, to a honeychecker registry on a second server, the first username, wherein the honeychecker registry is a list of valid usernames;
   fourth instructions executable by a device to cause the device to delete the first token and the first set of client identifiers from the first server;
   fifth instructions executable by a device to cause the device to receive, on a second first server, the token and a second set of client identifiers for the client, wherein:
      the second token is encrypted,
      the second token is equivalent to the first token, and
      the second set of client identifiers includes:
         a second hashed password, and
         a second username;
   sixth instructions executable by a device to cause the device to decrypt the second token using a decryption key to reveal the first set of client identifiers; and
   seventh instructions executable by a device to cause the device to compare the second hashed password to the first hashed password from the second token to verify an identity of the client;
   eighth instructions executable by a device to cause the device to determine that the second username does not appear in the honeychecker registry; and
   ninth instructions executable by a device to cause the device to deny, to the client, responsive to determining that the second username does not appear in the honeychecker registry, access to the account to prevent an unauthorized access.

5. The computer program product of claim 4, further comprising:
tenth instructions executable by a device to cause the device to log the second username to an authentication log.

6. The computer program product of claim 4, wherein first instructions to create the first token are further based, at least in part, on a device identifier for a device used by the client.

7. A computer system comprising:
a processor set; and
a computer readable storage medium;
wherein:
   the processor set is structured, located, connected, and/or programmed to execute instructions stored on the computer readable storage medium; and
   the instructions include:
      first instructions executable by a device to cause the device to create a first token on a first server based, at least in part, on a first set of client identifiers for a client and an encryption key, wherein:
         the first set of client identifiers includes:
            a first hashed password for the client, and
            a first username for the client, and
         the first token is encrypted;
      second instructions executable by a device to cause the device to transmit the first token from the first server to the client;
      third instructions executable by a device to cause the device to add, to a honeychecker registry on a second server, the first username, wherein the honeychecker registry is a list of valid usernames;
      fourth instructions executable by a device to cause the device to delete the first token and the first set of client identifiers from the first server;
      fifth instructions executable by a device to cause the device to receive, on a second first server, the token and a second set of client identifiers for the client, wherein:
         the second token is encrypted,
          the second token is equivalent to the first token, and
         the second set of client identifiers includes:
            a second hashed password, and
            a second username;
      sixth instructions executable by a device to cause the device to decrypt the second token using a decryption key to reveal the first set of client identifiers; and
      seventh instructions executable by a device to cause the device to compare the second hashed password to the first hashed password from the second token to verify an identity of the client;
      eighth instructions executable by a device to cause the device to determine that the second username does not appear in the honeychecker registry; and
      ninth instructions executable by a device to cause the device to deny, to the client, responsive to determining that the second username does not appear in the honeychecker registry, access to the account to prevent an unauthorized access.

8. The computer system of claim 7, further comprising:
tenth instructions executable by a device to cause the device to log the second username to an authentication log.

9. The computer system of claim 7, wherein first instructions to create the first token are further based, at least in part, on a device identifier for a device used by the client.

\* \* \* \* \*